US012723910B2

(12) United States Patent
Wang et al.

(10) Patent No.: US 12,723,910 B2
(45) Date of Patent: Sep. 1, 2026

(54) FILTERING METHOD AND FILTERING CONTROL APPARATUS FOR LOAD CELL

(71) Applicants: Mettler-Toledo (Changzhou) Measurement Technology Ltd., Changzhou (CN); Mettler-Toledo (Changzhou) Precision Instruments Ltd., Changzhou (CN); Mettler-Toledo International Trading (Shanghai) Co., Ltd., Shanghai (CN)

(72) Inventors: Shenhui Wang, Changzhou (CN); Along Wei, Changzhou (CN); Qin Sun, Changzhou (CN); Qi Wan, Changzhou (CN); Song Zhang, Changzhou (CN)

(73) Assignees: Mettler-Toledo (Changzhou) Measurement Technology Ltd., Changzhou (CN); Mettler-Toledo (Changzhou) Precision Instruments Ltd., Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 290 days.

(21) Appl. No.: 18/571,375

(22) PCT Filed: Jun. 29, 2022

(86) PCT No.: PCT/CN2022/102240
§ 371 (c)(1),
(2) Date: Dec. 18, 2023

(87) PCT Pub. No.: WO2023/274285
PCT Pub. Date: Jan. 5, 2023

(65) Prior Publication Data
US 2024/0280400 A1 Aug. 22, 2024

(30) Foreign Application Priority Data
Jul. 1, 2021 (CN) ........................ 202110743717.5

(51) Int. Cl.
*G01G 23/10* (2006.01)

(52) U.S. Cl.
CPC .................................... *G01G 23/10* (2013.01)

(58) Field of Classification Search
CPC ..... G01G 23/10; G01G 23/01; H03H 17/0202
(Continued)

(56) References Cited

U.S. PATENT DOCUMENTS 4,815,547 A * 3/1989 Dillon ...................... G01G 3/18 73/1.13
5,076,375 A * 12/1991 Dillon ..................... B66C 23/48 177/25.19

(Continued)

FOREIGN PATENT DOCUMENTS

CN 115560838 * 1/2023 ............. G01G 23/10
JP 5823800 B2 11/2015
WO WO-2023274285 A1 * 1/2023 ............. G01G 23/10

*Primary Examiner* — John E Breene
(74) *Attorney, Agent, or Firm* — Standley Law Group LLP; Jeffrey S. Standley; Adam J. Smith

(57) ABSTRACT

These disclosures provide a filtering method and control apparatus for a load cell. The method includes: filtering, by using a plurality of filtering units, first weighing data obtained by the load cell to obtain a plurality of pieces of second weighing data, where the filtering units have different settling times. Obtaining a fluctuation index of each piece of second weighing data, and establishing a correspondence between a fluctuation index and a settling time of each filtering unit. Determining a target filtering unit based on the correspondence according to a weighing requirement, where a fluctuation index of the target filtering unit matches a target precision in the weighing requirement, and a settling time of the target filtering unit matches a target speed in the weighing requirement. The method and apparatus disclosed improves speed and user experience in a weighing process.

10 Claims, 4 Drawing Sheets

(58) Field of Classification Search
USPC .......................................................... 177/185
See application file for complete search history.

(56) References Cited

U.S. PATENT DOCUMENTS

| | | | | |
|---|---|---|---|---|
| 5,130,938 | A * | 7/1992 | Inoue ..................... | G01G 3/147 702/194 |
| 6,271,484 | B1 * | 8/2001 | Tokutsu ................. | G01G 23/10 177/25.18 |
| 7,129,424 | B2 | 10/2006 | Vilhjalmsson et al. | |
| 8,421,530 | B2 * | 4/2013 | Lee ........................ | H03H 17/02 327/552 |

* cited by examiner

FILTERING METHOD AND FILTERING CONTROL APPARATUS FOR LOAD CELL

TECHNICAL FIELD

The present invention mainly relates to the field of precision weighing instruments, and in particular, to a filtering method and a filtering control apparatus for a load cell.

BACKGROUND ART

Some industrial applications have increasingly high requirements on precision and performance of load cells. During the use of a weighing system having a load cell as the main component, due to the impact of a weighing behavior, fluctuation interference caused by a device and an external environment, or the like, a weighing signal has weighing fluctuation interference errors. To eliminate these errors, filtering processing may be performed on the weighing signal. However, to obtain a high-precision weighing signal, a settling time of a filter becomes longer accordingly, resulting in a lower weighing speed.

U.S. Pat. No. 7,129,424 provides a filter adaptive method based on a weighing behavior. The filter adaptive method is associated with a time from a dynamic state to a stable state of a weighing signal, to determine the fastest filter that fulfills a fluctuation precision requirement as the current filter. The technology of this patent preferably adapts to a process of switching between "dynamic" and "stable", but there is no processing specific to a "dynamic" process and a "stable" process. As a result, the application scope of the technology of this patent is limited, and the application effect of the filter adaptive technology is limited.

SUMMARY OF THE INVENTION

To solve the foregoing technical problem, the present invention provides a filtering method and a filtering control apparatus for a load cell, to expand the application scope of the filter adaptive technology and improve the application effect of the filter adaptive technology.

To solve the foregoing technical problem, the present invention provides a filtering method for a load cell, characterized in that the method includes: filtering, by using a plurality of filtering units, first weighing data obtained by the load cell, to obtain a plurality of pieces of second weighing data, where the plurality of filtering units have different settling times; obtaining a fluctuation index of each piece of second weighing data, and establishing a correspondence between a fluctuation index and a settling time of each filtering unit; and determining a target filtering unit based on the correspondence according to a weighing requirement, where a fluctuation index of the target filtering unit matches a target precision in the weighing requirement, and a settling time of the target filtering unit matches a target speed in the weighing requirement.

In an embodiment of the present invention, each filtering unit includes one or more filters, and filters of different filtering units have different filtering parameters.

In an embodiment of the present invention, each of the plurality of filters has a different filtering parameter.

In an embodiment of the present invention, the step of obtaining a fluctuation index of each piece of second weighing data includes: calculating a range or a variance of the second weighing data within a predetermined time period, and using the range or the variance as the fluctuation index.

In an embodiment of the present invention, the step of establishing a correspondence between a fluctuation index and a settling time of each filtering unit includes: establishing a coordinate system, where the coordinate system uses the settling time as a horizontal axis and the fluctuation index as a vertical axis; and determining a characteristic point in the coordinate system, where the characteristic point is used to represent a filtering unit corresponding to the settling time and the fluctuation index.

In an embodiment of the present invention, the step of determining a target filtering unit based on the correspondence according to a weighing requirement includes: in the coordinate system, determining on the horizontal axis a first range of the settling time that fulfills the target speed, determining on the vertical axis a second range of the fluctuation index that fulfills the target precision, and determining the target filtering unit according to a crossing area of the first range and the second range in the coordinate system.

In an embodiment of the present invention, the method further includes: obtaining the weighing requirement to be fulfilled for a weighing application, including: assigning a first weight to the target speed, and adjusting the target speed to an adjusted target speed according to the first weight; and assigning a second weight to the target precision, and adjusting the target precision to an adjusted target precision according to the second weight.

In an embodiment of the present invention, the step of determining a target filtering unit based on the correspondence according to a weighing requirement further includes: determining, according to the correspondence, the target filtering unit that fulfills the adjusted target speed and the adjusted target precision.

In an embodiment of the present invention, the method further includes: providing a user input interface and obtaining the weighing requirement via the user input interface.

To solve the foregoing technical problem, the present invention further provides a filtering control apparatus for a load cell, characterized in that the apparatus includes: a memory, configured to store instructions executable by a controller; and the controller, configured to control the load cell and execute the instructions to implement the foregoing filtering method.

According to the filtering method and the filtering control apparatus for a load cell in the present invention, the first weighing data is filtered by using a plurality of filtering units having different settling times, to obtain the plurality of pieces of second weighing data and the fluctuation indexes thereof. The correspondence between a fluctuation index and a settling time of each filtering unit may be established to determine the target filtering unit that best fulfills the weighing requirement. The target filtering unit may be used in a weighing application to best fulfill the user requirement and achieve fast and good user experience in a weighing process.

BRIEF DESCRIPTION OF THE DRAWINGS

The accompanying drawings are included to provide a further understanding of the present application and are incorporated in and constitute a part of the present application, show the embodiments of the present application, and serve to, together with this specification, explain the principles of the present invention. In the accompanying drawings.

DETAILED DESCRIPTION OF EMBODIMENTS

Figure 1:
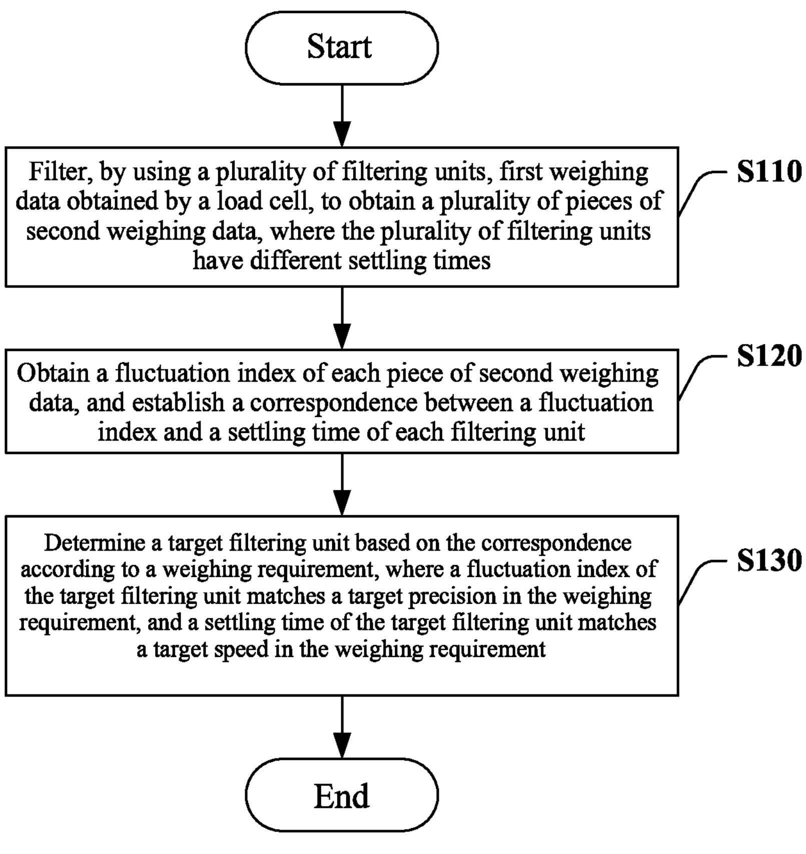
FIG. 1 is an exemplary flowchart of a filtering method for a load cell according to an embodiment of the present invention.

To describe the technical solutions in embodiments of the present application more clearly, the accompanying drawings required for describing the embodiments will be briefly described below. Apparently, the accompanying drawings in the following description show merely some examples or embodiments of the present application, and those of ordinary skill in the art would apply the present application to other similar scenarios according to these drawings without any creative effort. Unless it is obvious from the context or otherwise stated, the same reference numerals in the accompanying drawings represent the same structure or operation.

As shown in the present application and the claims, unless the context expressly indicates otherwise, the words "a", "an", "said", and/or "the" do not specifically refer to the singular, but may also include the plural. Generally, the terms "include" and "comprise" only suggest that the expressly identified steps and elements are included, but these steps and elements do not constitute an exclusive list, and the method or device may further include other steps or elements.

Unless specifically stated otherwise, the relative arrangement of components and steps, numerical expressions and numerical values set forth in these embodiments do not limit the scope of the present application. In addition, it should be understood that, for ease of description, the sizes of various parts shown in the drawings are not drawn to scale. The technologies, methods, and devices known to those of ordinary skill in the related art may not be discussed in detail, but where appropriate, the technologies, methods, and devices should be regarded as part of the authorization specification. In all examples shown and discussed here, any specific value should be interpreted as merely exemplary and not as limiting. Therefore, other examples of the exemplary embodiment may have different values. It should be noted that similar reference signs and letters refer to similar items in the following drawings. Therefore, once a specific item is defined in one of the drawings, it need not be further discussed in subsequent drawings.

In the description of the present application, it should be understood that, an orientation or position relationship indicated by orientation terms such as "front, rear, upper, lower, left, and right", "transverse, longitudinal, vertical, and horizontal", and "top and bottom" is usually based on an orientation or position relationship shown in the drawings, which is only for the convenience of describing the present application and simplifying the description. Unless otherwise stated, these orientation terms do not indicate or imply that an apparatus or element referred to must have a specific orientation or be constructed and operated in a specific orientation, so that the orientation terms cannot be understood as a limitation of the protection scope of the present application; and the orientation terms "inner and outer" refer to the inside and outside relative to the contour of each component itself.

For convenience of description, spatially relative terms such as "on", "above". "on the top surface", and "upper" can be used herein to describe a spatial position relationship between a device or a feature shown in the figure and other devices or features. It should be understood that spatially relative terms are intended to include different orientations in use or operation in addition to the orientation of the device described in the figure. For example, if the device in the figure is inverted, the device described as "on other devices or structures" or "above other devices or structures" will then be positioned as "under other devices or structures" or "below other devices or structures". Therefore, the exemplary term "above" may include two orientations "above" and "below". The device may also be positioned in other different manners (rotated by 90 degrees or in other orientations), and spatially relative description used here is explained accordingly.

In addition, it should be noted that the use of words such as "first" and "second" to define parts is merely for the convenience of distinguishing between corresponding parts. Unless otherwise stated, the above words have no special meaning and therefore cannot be understood as limitation of the protection scope of the present application. Furthermore, although the terms used in the present application are selected from well-known common terms, some of the terms mentioned in the specification of the present application may have been selected by the applicant according to his or her determination, and the detailed meaning thereof is described in the relevant section described herein. Furthermore, the present application must be understood, not simply by the actual terms used but also by the meanings encompassed by each term.

In the present application, a flowchart is used to illustrate the operations performed by a system according to the embodiments of the present application. It should be understood that the preceding or following operations are not necessarily performed exactly in order. Instead, the various steps may be processed in reverse order or simultaneously. In addition, other operations are added to these processes, or a certain step or several operations are removed from these processes.

FIG. 1 is an exemplary flowchart of a filtering method for a load cell according to an embodiment of the present invention. Referring to FIG. 1, the filtering method of this embodiment includes the following steps:

Step S110: Filter, by using a plurality of filtering units, first weighing data obtained by the load cell, to obtain a plurality of pieces of second weighing data, where the plurality of filtering units have different settling times.

Step S120: Obtain a fluctuation index of each piece of second weighing data, and establish a correspondence between a fluctuation index and a settling time of each filtering unit.

Step S130: Determine a target filtering unit based on the correspondence according to a weighing requirement, where a fluctuation index of the target filtering unit matches a target precision in the weighing requirement, and a settling time of the target filtering unit matches a target speed in the weighing requirement.

Figure 2:
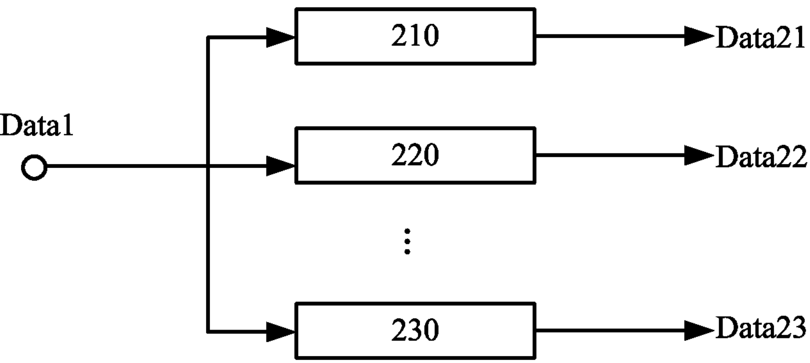
FIG. 2 is a schematic structural diagram of a filtering unit of a load cell according to an embodiment of the present invention.

FIG. 2 is a schematic structural diagram of a filtering unit of a load cell according to an embodiment of the present invention. Step S110 to step S130 are described below with reference to FIG. 2.

The load cell usually has a filter to filter a weighing signal measured by the load cell, to remove an interference error that affects a weighing result. A common load cell has a fixed filter, which has a fixed filtering parameter and a fixed filtering mode. For example, a low-pass filter has a fixed cutoff frequency and a fixed order, and has different filtering performance depending on a transfer function.

In step S110, the first weighing data is a weighing signal measured by the load cell in a weighing application.

Referring to FIG. 2, in step S110, the first weighing data Data1 is filtered by using a plurality of filtering units 210, 220, and 230, to obtain a plurality of pieces of second weighing data Data21, Data22, and Data23. It can be understood that the load cell obtains the first weighing data Data1, where the first weighing data Data1 is not a piece of data, but instead is a segment of data within a period of time. After filtering, one filtering unit corresponds to one piece of second weighing data. Therefore, a plurality of pieces of second weighing data can be obtained. Correspondingly, the second weighing data also includes a segment of data.

Referring to FIG. 2, the plurality of filtering units 210, 220, and 230 have different settling times. It can be understood that the settling time depends on a specific parameter of a filter included in a filtering unit.

In a filter, a settling time (ST) of an amplifier is a time required for an output response of an operational amplifier to enter and maintain a specified error range when an input of the operational amplifier is a step signal. The settling time may be used to represent the stability performance of the filter.

In some embodiments, the plurality of filtering units further have different filtering precisions. Both the filtering precision and the settling time are indexes used to indicate the performance of a filtering unit.

FIG. 2 is only an example and is not used to limit the number of filtering units and the number of pieces of second weighing data.

In some embodiments, each filtering unit includes one or more filters, and filters of different filtering units have different filtering parameters.

In some embodiments, a filtering unit may include only one filter, and filters of different filtering units have different filtering parameters. The filtering parameter may include all parameters that affect performance of a filter, such as a filter type, a cutoff frequency, a transfer function, and an order. The filter type may include a low-pass filter, a wave trap, a band-stop filter, or the like. Specific content of the filtering parameter is not limited in the present invention, and may include any parameter in the art that may affect the performance of a filter.

In the embodiment in which the filtering unit includes a plurality of filters, the plurality of filters may all be the same, or may be different from each other, or some of the filters are the same and the other filters are different. Different filters have different filtering parameters.

In step S110, the first weighing data Data1 may be filtered sequentially by using the plurality of filtering units, or may be filtered simultaneously by using the plurality of filtering units. It can be understood that the second weighing data Data21, Data22, and Data23 are different from each other due to different settling times.

In step S120, the second weighing data is analyzed to obtain a fluctuation index R of each piece of second weighing data. The fluctuation index R is used to indicate a filtering precision of a filtering unit. For example, the second weighing data may be a signal obtained by superimposing some fluctuations on a direct-current signal. The direct-current signal represents a true weight obtained by the load cell, and the fluctuation represents noise that still exists after filtering by the filtering unit or an error caused to a true weight after filtering. It can be understood that the higher the filtering precision of the filtering unit, the smaller the fluctuation, and the smaller the fluctuation index R of the second weighing data. The fluctuation index R is a numerical value for describing the degree of fluctuation of the second weighing data.

In some embodiments, the first weighing data includes noisy data, the second weighing data includes filtered noisy data, and the fluctuation index R includes a fluctuation index of the filtered noisy data. In these embodiments, when a weighing application is in a stable state, the weight signal in the second weighing data is a stable direct-current signal, and the fluctuation index R represents the fluctuation of the filtered noisy data, that is, the fluctuation index R of the noisy data.

In some embodiments, the step of obtaining a fluctuation index R of each piece of second weighing data includes: calculating a range or a variance of the second weighing data within a predetermined time period, and using the range or the variance as the fluctuation index R.

For example, the second weighing data Data21 in FIG. 2 has a variance V1 within a predetermined time period TO. In this case, the variance V1 is used as a fluctuation index R1 of the second weighing data Data21. Obviously, the fluctuation index R1 corresponds to the filtering unit 210. Similarly, a range of the second weighing data Data21 within the predetermined time period TO can be calculated, and the range can be used as the fluctuation index R1 of the second weighing data Data21.

Step S120 further includes: establishing a correspondence between a fluctuation index R and a settling time ST of each filtering unit. It can be understood that, for example, a settling time of the filtering unit 210 is ST1, the first weighing data Data1 is filtered by using the filtering unit 210 to obtain the second weighing data Data21, and the second weighing data Data21 has the fluctuation index R1. In this case, the correspondence includes (210, ST1, R1). By analogy, a plurality of correspondences can be established for the filtering units.

In some embodiments, the step of establishing a correspondence between a fluctuation index and a settling time of each filtering unit includes the following steps:

Step S122: Establish a coordinate system, where the coordinate system uses the settling time as a horizontal axis and the fluctuation index as a vertical axis.

Step S124: Determine a characteristic point in the coordinate system, where the characteristic point is used to represent a filtering unit corresponding to the settling time and the fluctuation index.

Figure 3:
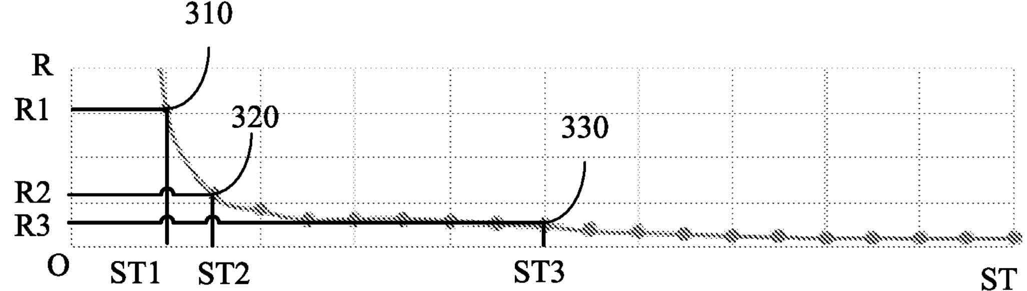
FIG. 3 is a schematic diagram of a correspondence established in a filtering method according to an embodiment of the present invention.

FIG. 3 is a schematic diagram of a correspondence established in a filtering method according to an embodiment of the present invention. Referring to FIG. 3, the horizontal axis is a settling time ST, and the vertical axis is a fluctuation index R. The coordinate system has a plurality of characteristic points, such as characteristic points 310, 320, and 330 in FIG. 3. As shown in FIG. 2, the characteristic point 310 may correspond to the filtering unit 210, the settling time of the filtering unit 210 is ST1, and the fluctuation index of the filtering unit 210 is R1, and so on.

As shown in FIG. 3, according to experimental data, a curve in FIG. 3 can be obtained by connecting a plurality of characteristic points. The curve reflects a characteristic that as the settling time increases, the fluctuation index becomes smaller, and the filtering precision of the filtering unit becomes higher.

In some embodiments, a unit of the vertical axis R is kilogram (kg) and a unit of the horizontal axis ST is second (s), which is related to setting of the load cell.

FIG. 3 is for illustration only and is not used to limit specific positions of characteristic points representing filtering units and a shape of the connecting line of the plurality of characteristic points.

In step S130, the target filtering unit is determined based on the correspondence according to the weighing requirement. The weighing requirement includes a target speed and a target precision. The target speed is a weighing speed to be fulfilled for the weighing application, and the target precision is a weighing precision to be fulfilled for the weighing application.

In some embodiments, to obtain the weighing requirement in this step, a user input interface or module may be provided, so that a user can input a desired weighing requirement. For different weighing applications, users have different weighing requirements.

In step S130, the target filtering unit fulfilling the weighing requirement is determined based on the correspondence. The target filtering unit has a fluctuation index and a settling time. The fluctuation index needs to match the target precision in the weighing requirement, and the settling time needs to match the target speed in the weighing requirement.

For example, if a weighing requirement set by a user A for a weighing application B1 is that the target speed is the settling time ST1 and the target precision is the fluctuation index R1, the filtering unit 210 may be selected as the target filtering unit. Different users may set different weighing requirements for a same weighing application.

In some embodiments, the target speed and the target precision may be indicated by ranges. For example, if the target speed is set to a settling time less than or equal to ST2 and the target precision is set to a fluctuation index less than or equal to R1, according to the correspondence shown in FIG. 3, both the filtering units 210 and 220 fulfill the weighing requirement and can be used as target filtering units.

In some embodiments, the step of determining a target filtering unit based on the correspondence according to a weighing requirement includes: in the coordinate system, determining on the horizontal axis a first range of the settling time that fulfills the target speed, determining on the vertical axis a second range of the fluctuation index that fulfills the target precision, and determining the target filtering unit according to a crossing area of the first range and the second range in the coordinate system. For example, referring to FIG. 3, the target speed is that the settling time falls within a first range F1 [ST1, ST2], and the target precision is that the fluctuation index falls within a second range F2 [R1, R2]. In this case, the filtering units 210 and 220 may be selected as target filtering units.

In step S130, according to the weighing requirement set by the user, an appropriate filtering unit is selected as the target filtering unit that best fulfills the requirement of the user. It can also be considered that the filtering unit is an optimal filtering unit.

In some embodiments, the filtering method of the present invention further includes: a step of obtaining the weighing requirement to be fulfilled for a weighing application, including: assigning a first weight W1 to the target speed, and adjusting the target speed to an adjusted target speed according to the first weight W1; and assigning a second weight W2 to the target precision, and adjusting the target precision to an adjusted target precision according to the second weight W2. These embodiments provide users with more setting functions, to fulfill different requirements.

For example, some weighing applications focus on precision, but can endure a long waiting time. Therefore, the second weight W2 assigned to the target precision may be larger, and the first weight W1 assigned to the target speed may be smaller. However, some weighing applications focus on speed and do not require a high measurement precision. Therefore, the first weight W1 assigned to the target speed may be larger, and the second weight W2 assigned to the target precision may be smaller. Specifically, assuming that the first weight W1 and the second weight W2 are quantified by scores, both the first weight W1 and the second weight W2 may be set to fall within a range of 1 to 10. Being closer to 1 indicates less importance and being closer to 10 indicates more importance.

In these embodiments, the adjusted weighing requirement including the adjusted target speed and the adjusted target precision can be obtained, and a curve of the adjusted correspondence can also be obtained. There is a point that best fulfills the weighing requirement in the curve of the adjusted correspondence. Then, in step S130, the target filtering unit that fulfills the adjusted target speed and the adjusted target precision is correspondingly determined according to the adjusted correspondence.

In steps S110 to S130, the target filtering unit that best fulfills the weighing requirement and the optimal filter parameter can be determined, to expand the application scope of the filter adaptive technology and improve the application effect of the filter adaptive technology. When the target filtering unit determined according to the method of the present invention is used in a weighing application, the user requirement can be best fulfilled and fast and good user experience can be achieved in a weighing process. The present invention further includes a filtering control apparatus for a load cell, including a memory and a processor. The memory is configured to store instructions executable by the processor. The processor is configured to execute the instructions to implement the foregoing filtering method for a load cell.

Figure 4:
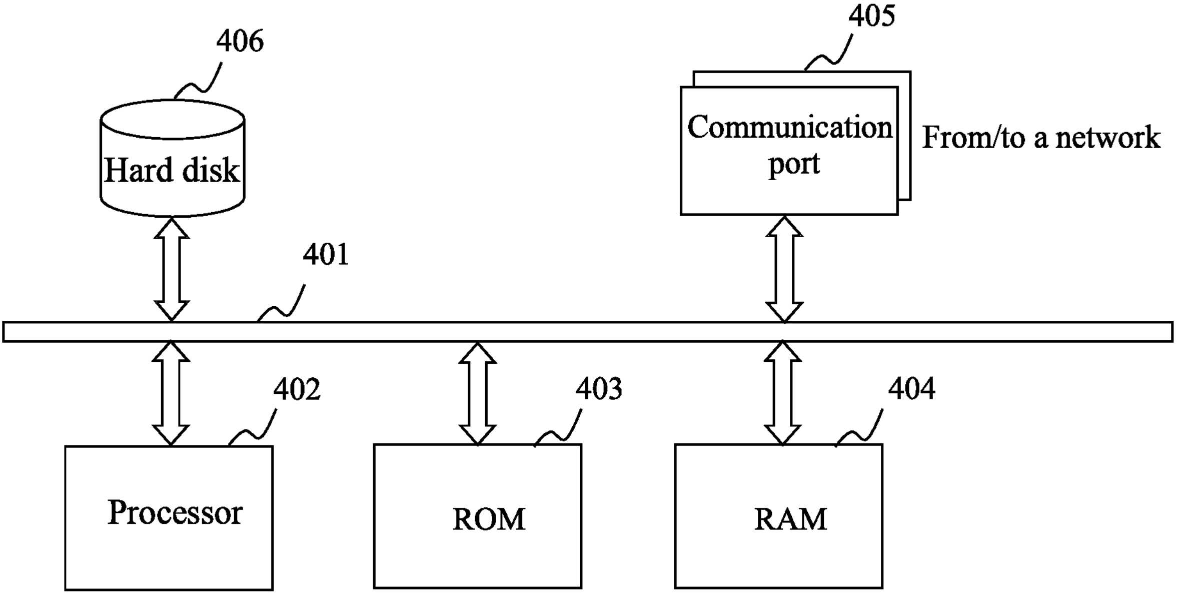
FIG. 4 is a system block diagram of a filtering control apparatus for a load cell according to an embodiment of the present invention.

FIG. 4 is a system block diagram of a filtering control apparatus for a load cell according to an embodiment of the present invention. Referring to FIG. 4, the filtering control apparatus 400 may include an internal communication bus 401, a processor 402, a read-only memory (ROM) 403, a random access memory (RAM) 404, and a communication port 405. When applied to a personal computer, the filtering control apparatus 400 may further include a hard disk 407. The internal communication bus 401 can implement data communication between components of the filtering control apparatus 400. The processor 402 can perform determination and give a prompt. In some embodiments, the processor 402 may include one or more processors. The communication port 405 can implement data communication between the filtering control apparatus 400 and the outside. In some embodiments, the filtering control apparatus 400 can receive and send information and data from/to a network through the communication port 405. The filtering control apparatus 400 may further include different forms of program storage units and data storage units, such as the hard disk 407, the read-only memory (ROM) 403 and the random access memory (RAM) 404, which can store various data files used for computer processing and/or communication, and possible program instructions executed by the processor 402. The processor executes these instructions to implement the main part of the method. A processing result from the processor is transmitted to user equipment through the communication port and displayed in a user interface.

The foregoing filtering method for a load cell may be implemented as a computer program, stored in the hard disk 407, and can be loaded into the processor 402 for execution, so as to implement the filtering method for a load cell of the present application.

It should be understood that the embodiments described above are merely illustrative. The embodiments described herein can be implemented in hardware, software, firmware, middleware, microcode, or any combination thereof. For hardware implementation, the processor can be implemented in one or more application-specific integrated circuits (ASIC), digital signal processors (DSP), digital signal processing devices (DSPD), programmable logic devices (PLD), field programmable gate arrays (FPGA), processors, controllers, microcontrollers, microprocessors, and/or other electronic units designed to perform the functions described herein, or a combination thereof.

Some aspects of the present application may be completely executed by hardware, or may be completely executed by software (including firmware, resident software, microcode, etc.), or may be executed by a combination of hardware and software. The hardware or software described above may all be referred to as "data block", "module", "engine", "unit", "component", or "system". The processor may be one or more application-specific integrated circuits (ASIC), digital signal processors (DSP), digital signal processing devices (DSPD), programmable logic devices (PLD), field-programmable gate arrays (FPGA), processors, controllers, microcontrollers, microprocessors, or a combination thereof. In addition, various aspects of the present application may be embodied as a computer product in one or more computer-readable media, and the product includes computer-readable program code. For example, the computer-readable media may include, but are not limited to, a magnetic storage device (for example, a hard disk, a floppy disk, a tape . . . ), an optical disc (for example, a compact disc (CD), a digital versatile disc (DVD) . . . ), a smart card, and a flash memory device (for example, a card, a stick, a key drive . . . ).

The computer-readable medium may include a propagation data signal containing computer program code, for example, on a baseband or as a part of a carrier. The propagation signal may take various forms, including an electromagnetic form, an optical form, etc., or a suitable combination form. The computer-readable medium may be any computer-readable medium other than a computer-readable storage medium. The medium may be connected to an instruction execution system, apparatus, or device to implement communication, propagation, or transmission of a program for use. The program code located on the computer-readable medium can be propagated through any suitable medium, including radio, a cable, a fiber-optic cable, a radio frequency signal, or a similar medium, or any combination of the foregoing media.

The basic concepts have been described above. Obviously, for those skilled in the art, the foregoing disclosure of the present invention is merely an example, and does not constitute a limitation to the present application. Those skilled in the art may make various modifications, improvements, and amendments to the present application, although it is not explicitly stated here. Such modifications, improvements, and amendments are suggested in the present application, and therefore, such modifications, improvements, and amendments still fall within the spirit and scope of exemplary embodiments of the present application.

Also, the present application uses specific words to describe embodiments of the present application. For example, "one embodiment", "an embodiment", and/or "some embodiments" mean a certain feature, structure, or characteristic related to at least one embodiment of the present application. Therefore, it should be emphasized and noted that "an embodiment" or "one embodiment" or "an alternative embodiment" mentioned twice or more in different positions in this specification does not necessarily refer to the same embodiment. In addition, certain features, structures, or characteristics in one or more embodiments of the present application can be appropriately combined.

In some embodiments, numbers for describing the number of compositions and attributes are used. It should be understood that such numbers used in the description of the embodiments are modified by the modifier "about", "approximately", or "substantially" in some examples. Unless otherwise stated, "about", "approximately", or "substantially" indicates that the number is allowed to vary by +20%. Correspondingly, in some embodiments, the numerical parameters used in the specification and claims are approximate values, and the approximate values can be changed according to the required characteristics of individual embodiments. In some embodiments, for the numerical parameters, the specified significant digits should be taken into consideration and a general digit reservation method should be used. Although the numerical ranges and parameters used to confirm the breadth of the ranges of the numerical parameters in some embodiments of the present application are approximate values, such numerical values need to be set as precisely as possible within a feasible range in specific embodiments.

The invention claimed is:

1. A filtering method for a load cell, said method comprising:

filtering, by using a plurality of filtering units, first weighing data obtained by the load cell to obtain a plurality of pieces of second weighing data, wherein the plurality of filtering units have different settling times;

obtaining a fluctuation index of each piece of second weighing data, and establishing a correspondence between a fluctuation index and a settling time of each of the plurality of filtering units; and determining a target filtering unit based on the correspondence according to a weighing requirement, wherein a fluctuation index of the target filtering unit matches a target precision in the weighing requirement, and a settling time of the target filtering unit matches a target speed in the weighing requirement.

2. The filtering method according to claim 1, wherein each of the plurality of filtering units comprises one or more filters, and the one or more filters of different ones of the plurality of filtering units have different filtering parameters.

3. The filtering method according to claim 2, wherein each of the plurality of filters has a different filtering parameter.

4. The filtering method according to claim 1, wherein the step of obtaining a fluctuation index of each piece of second weighing data comprises:

calculating a range or a variance of the second weighing data within a predetermined time period, and using the range or the variance as the fluctuation index.

5. The filtering method according to claim 1, wherein the step of establishing the correspondence between the fluctuation index and the settling time of each of the plurality of filtering units comprises:

establishing a coordinate system, wherein the coordinate system uses the settling time as a horizontal axis and the fluctuation index as a vertical axis; and determining a characteristic point in the coordinate system, wherein the characteristic point is used to represent a filtering unit corresponding to the settling time and the fluctuation index.

6. The filtering method according to claim 5, wherein the step of determining the target filtering unit based on the correspondence according to the weighing requirement comprises: in the coordinate system, determining on the horizontal axis a first range of the settling time that fulfills the target speed, determining on the vertical axis a second range of the fluctuation index that fulfills the target precision, and determining the target filtering unit according to a crossing area of the first range and the second range in the coordinate system.

7. The filtering method according to claim 1, wherein the method further comprises: obtaining the weighing requirement to be fulfilled for a weighing application, comprising:

assigning a first weight to the target speed, and adjusting the target speed to an adjusted target speed according to the first weight; and assigning a second weight to the target precision, and adjusting the target precision to an adjusted target precision according to the second weight.

8. The filtering method according to claim 7, wherein the step of determining the target filtering unit based on the correspondence according to the weighing requirement further comprises:

determining, according to the correspondence, the target filtering unit that fulfills the adjusted target speed and the adjusted target precision.

9. The filtering method according to claim 1, further comprising:

providing a user input interface and obtaining the weighing requirement via the user input interface.

10. A filtering control apparatus for a load cell, said apparatus comprising:

a memory comprising software instructions executable by a controller; and the controller configured to control the load cell, and, with execution of the software instructions stored at the memory, implement the filtering method of claim 1.

* * * * *